United States Patent
Le Briz et al.

(10) Patent No.: US 6,952,242 B2
(45) Date of Patent: Oct. 4, 2005

(54) CONVERGENCE CORRECTION OF A CRT SCREEN OR PROJECTOR

(75) Inventors: Olivier Le Briz, Grenoble (FR); Olivier Scouarnec, Sassenage (FR); Corinne Ianigro, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 490 days.

(21) Appl. No.: 09/881,892

(22) Filed: Jun. 15, 2001

(65) Prior Publication Data

US 2001/0052964 A1 Dec. 20, 2001

(30) Foreign Application Priority Data

Jun. 16, 2000 (FR) .............................. 00 07719

(51) Int. Cl.[7] ............................................... H04N 9/31
(52) U.S. Cl. .................. 348/807; 348/807; 315/368.18
(58) Field of Search ................................ 348/805, 806, 348/807, 808–810, 744, 745–747; 315/368.11, 368.18, 368.21, 370, 368.12, 368.13

(56) References Cited

U.S. PATENT DOCUMENTS

| | | | | |
|---|---|---|---|---|
| 4,500,816 A | * | 2/1985 | Murphy ................. | 315/368.11 |
| 4,843,284 A | * | 6/1989 | Schmitt et al. ............. | 315/371 |
| 4,877,998 A | * | 10/1989 | Maninger et al. ............. | 315/15 |
| 5,200,815 A | * | 4/1993 | Tsujihara et al. ........... | 348/181 |
| 5,298,985 A | * | 3/1994 | Tsujihara et al. ........... | 348/745 |
| 5,345,280 A | * | 9/1994 | Kimura et al. .............. | 348/745 |
| 5,461,431 A | * | 10/1995 | Takebuchi et al. .......... | 348/806 |
| 5,473,224 A | * | 12/1995 | Tsujihara et al. ...... | 315/368.18 |
| 5,532,765 A | * | 7/1996 | Inoue et al. ................ | 348/807 |
| 5,576,774 A | * | 11/1996 | Hosoi et al. ................ | 348/745 |
| 5,592,240 A | * | 1/1997 | Sakamoto et al. .......... | 348/807 |
| 5,694,181 A | * | 12/1997 | Oh ............................. | 348/807 |
| 5,734,233 A | * | 3/1998 | Masumoto et al. .... | 315/368.12 |
| 5,790,210 A | * | 8/1998 | Kim et al. .................. | 348/807 |
| 5,847,777 A | * | 12/1998 | George ....................... | 348/746 |
| 5,883,476 A | * | 3/1999 | Noguchi et al. ....... | 315/368.12 |
| 5,923,387 A | * | 7/1999 | Van der Sanden .......... | 348/806 |
| 5,963,274 A | * | 10/1999 | Youn .......................... | 348/745 |
| 6,008,596 A | * | 12/1999 | Ara ....................... | 315/368.11 |

FOREIGN PATENT DOCUMENTS

| | | |
|---|---|---|
| EP | 0 059 076 A1 | 9/1982 |
| JP | 63-149976 | 6/1988 |

* cited by examiner

*Primary Examiner*—Paulos M. Natnael
(74) *Attorney, Agent, or Firm*—Lisa K. Jorgenson; E. Russell Tarleton; Seed IP Law Group PLLC (57) ABSTRACT

A control signal for controlling a correction circuit for at least one electron beam that scans a screen line by line, the amplitude of which varies along each line according to a curve of a first type determined by line parameters, each of the line parameters varying, from one line to another, according to a curve of the first type determined by column parameters.

15 Claims, 7 Drawing Sheets

CONVERGENCE CORRECTION OF A CRT SCREEN OR PROJECTOR

TECHNICAL FIELD

The present invention relates to the control of CRT screens or projectors and more specifically to the control of means adapted to correcting the path of electron beams in such devices. The present invention will be described hereafter in relation with a CRT, but it should be noted that it more generally applies to any similar device (for example, a cathode-ray projector where, in the sense of the present invention, the bombarded surface of the tube is assimilated to a screen).

BACKGROUND OF THE INVENTION

To display color images, for example in a CRT screen, the inner surface of a CRT includes three arrays of red, green, and blue phosphors, arranged side by side according to various patterns. The three arrays of phosphors are excited by three very close electron beams deviated together, each of which hits the phosphors of a single color. A scanning control circuit enables deviating the electron beams according to a succession of horizontal lines.

Figure 1:
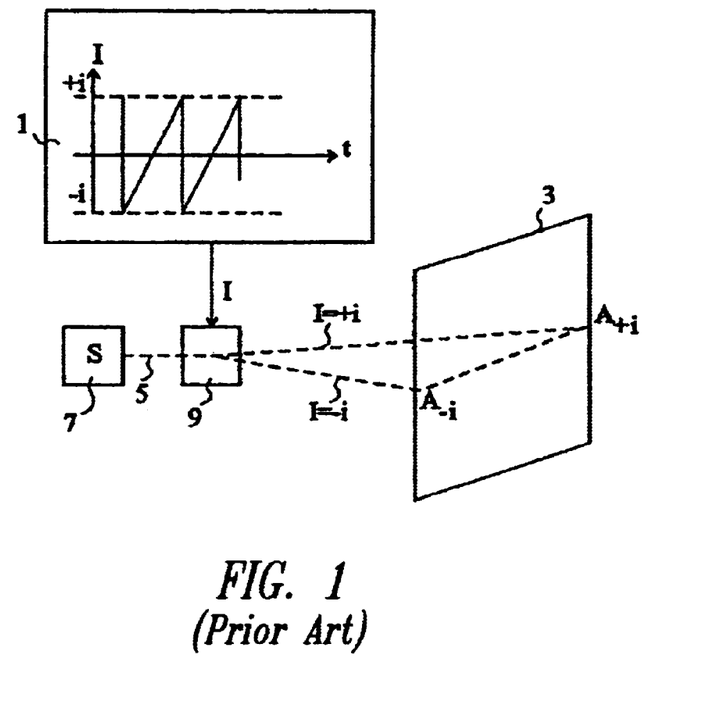
FIG. 1, previously described, schematically shows a horizontal scanning control circuit conventionally used with a CRT.

FIG. 1 very schematically and partially shows elements of a screen involved in the image display. Essentially, a horizontal scan control circuit 1 is used with a CRT screen 3 for displaying images based on a video signal (not shown). Circuit 1, synchronized in frequency and phase with the video signal, generates a current I for controlling the deviation of an electron beam 5 emitted by a source (S) 7. Current I has a sawtooth variation between a start of line value $-i$ and an end of line value $+i$. Current I acts upon a deviator 9 formed, for example, by coils, and determines the deviation of electron beam 5, the intensity of the beam varying according to the video signal. A single electron beam has been shown for clarity, as for a black and white screen. When current I linearly increases between values $-i$ and $+i$, the point of impact of beam 5 on screen 3 continuously varies between a position $A_{-i}$ and a position $A_{+i}$. A line is thus displayed on screen. Frame scan means, not shown, enable vertically deviating beam 5 along time, to successively scan all the image lines.

A disadvantage of such a screen is that beam 5 is indeed formed of three electron beams to be very accurately and identically deviated. Now, the sources of these electron beams are arranged to be as close as possible to one another but they are never ideally confounded. Small differences can then not be avoided upon deviation of these beams, which differences generally increase with the deviation angle.

Figure 2:
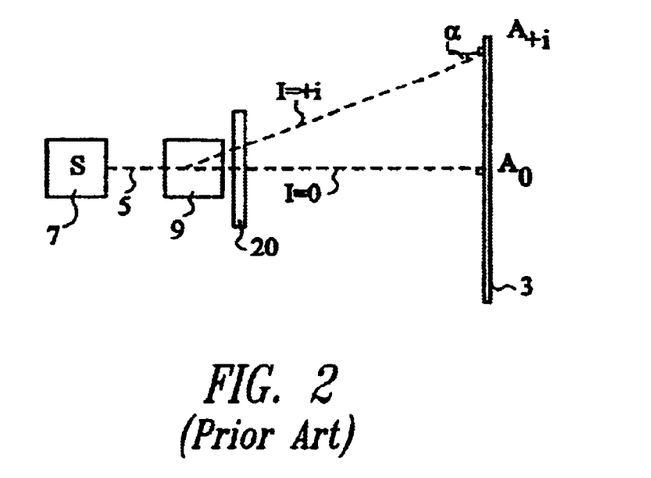
FIG. 2, previously described, schematically illustrates the variation of the angle of incidence of an electron beam of a CRT screen.

FIG. 2 schematically illustrates the variation of the angle of incidence of an electron beam 5 in the scanning of a line of screen 3. Assuming that the line perpendicular to the screen at a point $A_0$ contains the emission point of source 7, the phosphors located at this position $A_0$ (ideally, at the screen center) are lit with a null angle of incidence, while phosphors located at a position $A_{+i}$, at one end of the line, are lit with a non-zero angle of incidence $\alpha$. These errors or deviation defects result in that the three components of beam 5 do not hit screen 3 at a same point. This phenomenon is called a convergence defect and results on screen in a spatial dissociation of the three colors making up each of the points located in the areas where the convergence is not ensured. The presence of these areas is particularly apparent in the case of flat CRT screens, in which the angle of incidence of the electron beams can be high.

To display a correct image, the deviation of the components of electron beam 5 must be individually corrected. This selective correction of the beam convergence can be obtained by a correction means 20 that includes, for example, coils distinct from scanning coils 9. The type and arrangement of such coils, called correction coils, especially depend on the arrangement of the electron beam sources.

Figure 3A:
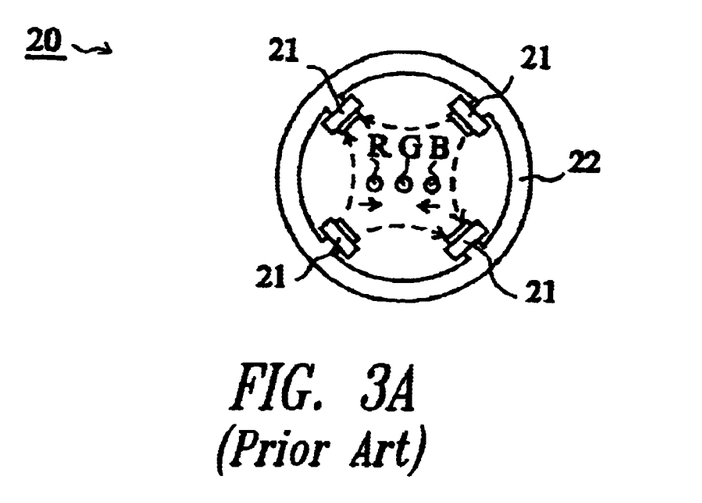
FIGS. 3A and 3B, previously described, schematically show coils of respectively horizontal and vertical correction of the convergence of the R, G, and B beams of a color screen.

FIG. 3A shows, in a front view, three R, G, B sources that generate three electron beams intended for respectively lighting the arrays of red, green, blue phosphors of a color screen (not shown). The R, G, B sources are, in this example, arranged according to a horizontal line parallel to the screen.

A correction means 20 includes four coils 21 having two by two the same axis, which are arranged around the R, G, and B sources along two perpendicular axes that cross at the level of the G source in a plane perpendicular to the beams. Coils 21 are interconnected, and their respective axes form angles of 45, 135, 225, and 315° with respect to the line formed by the R, G, and B sources. The structure illustrated as an example includes four coils 21, but other structures including a larger number of coils also exist. The coils are wound around magnetic cores connected to the internal periphery of a circular magnetic circuit 22. The main field lines between coils 21 have been shown by arrows in dotted lines. The correction is performed by the strongest deviation to which the beams emitted by the R and B sources, closer to the coils, are submitted. According to the direction of the current running through coils 21, the beams emitted by the R and B sources come closer or move away from the beam emitted by the G source. Assuming that beam G is centered, coils 21 enable adjusting the horizontal convergence of the beams emitted by the R, G and B sources.

Figure 3B:
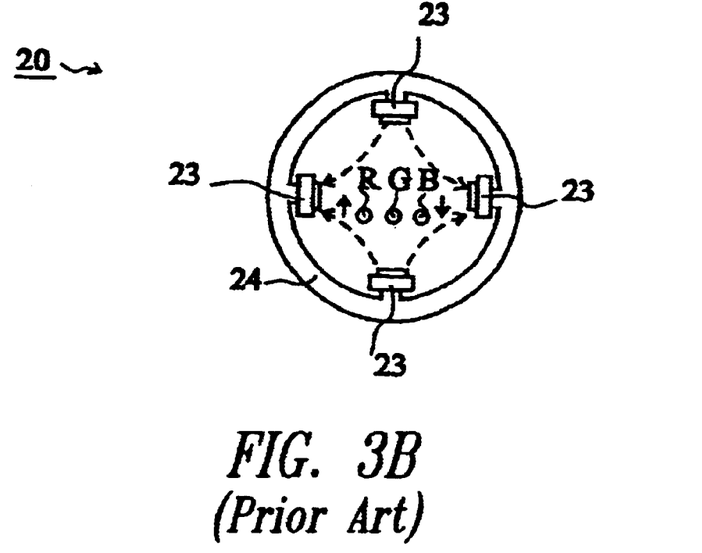

FIG. 3B shows four other coils 23 of correction means 20. Coils 23 also have the same axis two by two, and are arranged around the R, G, and B sources along two perpendicular axis that cross at the level of the G source in a plane perpendicular to the beams but (in this example) different from the plane in which the axes of coils 21 are inscribed (FIG. 3A). Coils 23 are interconnected and they are arranged so that their axes form angles of 45° with respect to the axes of coils 21. Coils 23 are wound around magnetic cores connected to the internal periphery of a circular magnetic circuit 24. The main field lines between coils 23 have been shown by arrows in dotted lines. According to the direction of the current running through coil 23, the beams emitted by the R and B sources move away or come closer to one another in opposite directions perpendicular to the line formed by the R, G and B sources. Assuming that beam G is centered, coils 23 enable adjusting the vertical convergence of the R, G, and B beams. For clarity, the supply means of the magnetic circuits have not been shown in FIGS. 3A and 3B. Such convergence correction systems are perfectly well known.

It should be noted that magnetic circuits 22 and 24 may be confounded. It is possible to use a combination of coils 21 and 23 to correct convergence problems due to the angle of incidence of the electron beams. Since the angle of incidence varies at each point of the screen, the control signals of coils 21 and 23 must be different for each point of the screen. Further, it is known that, to provide a satisfactory result, the control signals of the correction coils must have as few change of incline points as possible. Indeed, a change of incline of the control signal may in some cases be visible on screen, which is not desirable. Moreover, the control signals provided to the correction coils at a same point of two screens of same type are different, since each screen has specific convergence problems, for example due to the positioning of the sources upon manufacturing of the screen. These convergence problems that vary from one screen to another and above all from one area of the screen to another are called "dynamic" defects, as opposed to "static" convergence defects, which are uniform on a given screen. Such static defects can be corrected by means of coils 21 and 23, for example by application of a D.C. voltage. It should be noted that coils 21 and 23 also enable correcting other dynamic convergence problems, for example problems due to a localized magnetization of the frame. A conventional process consists of generating the control signals of the screen correction coils based on a predetermined number of numerical values measured and stored in the factory for each screen.

A first solution consists of empirically determining the value of the control signal to be provided to the correction coils at a predetermined number of points of several standard screen lines. The values stored for each standard line are provided to an analog filter, which generates a control signal used for the standard line and the neighboring lines. The manual determination of the stored values provided to the analog filter is a lengthy and expensive process, and the number of these values is desired to be as limited as possible. The control signal generated by the analog filter varies between two successive stored values at the rate of the filter loading or unloading. The number of stored values being limited, the time constant of the filter is as high as possible to limit changes of incline of the control signal. In spite of this, the obtained control signal still has changes of incline at the level of its highest points and the number of stored values remains high. Further, many modem display devices are led to pass from one display format to another, which especially implies that the scanning length or duration of a line may vary. The high time constant of the analog filter may be too high if the line scanning duration decreases. Further, the control signals generated for two consecutive standard lines may exhibit strong discontinuities, which is not desirable.

A second solution consists of performing, for example by means of a calculator, a numerical interpolation between the above-mentioned stored values. Such a solution enables generating a control signal curve with no break point. However, this solution has a complex implementation and still requires storage of a large number of numerical values for each line. Further, it is known by those skilled in the art that such an interpolation calculation is delicate to adapt to a change in the line length. For vertical variations, the control signals that are intended for the lines included between two standard lines can be generated by numerical interpolation between the control signals calculated for the two standard lines. Such a method however requires significant calculation resources and storage of a large number of values. Thus, the calculations required by this method cannot, in the state of the art, be performed by a sufficiently powerful calculator due to the scanning speeds involved.

SUMMARY OF THE INVENTION

An object of the present invention is to generate, by means of a reduced number of stored values, a control signal for a means of correction of an electron beam that scans a screen line by line.

Another object of the present invention is to provide a control signal for correction coils of a CRT screen.

Another object of the present invention is to generate such a control signal in a way that easily enables changing the display format, in particular the image size, position, and frequency.

Another object of the present invention is to generate such a control signal that varies according to a curve that exhibits no change of incline.

Another object of the present invention is to generate such a control signal that exhibits no discontinuity between two consecutive lines.

To achieve these objects, the present invention provides a control signal for controlling a means of correction of at least one electron beam that scans a screen line by line, the amplitude of which varies along each line according to a curve of a first type determined by line parameters, each of the line parameters varying, from one line to another, according to a curve of the first type determined by column parameters.

According to an embodiment of the present invention, each curve of the first type is the addition of a constant level, determined by a first parameter, of two half $X^n$ curves, where n is any predetermined value, located on either side of the center of the curve, the common origin of the half $X^n$ curves being located at the center of the curve and the maximum values of the half $X^n$ curves at the ends of the line being respectively determined by a second and a third parameters, and of a double-top curve with a continuous derivative, formed by at least two humps placed end to end and located on either side of the line center, each hump having a null derivative at its top, and each minimum or maximum value of the curve being respectively set by a distinct parameter.

According to an embodiment of the present invention, the double-top curve has a zero value and a null derivative at the center of the line.

According to an embodiment of the present invention, the double-top curve has a zero value and a null derivative at its ends.

According to an embodiment of the present invention, the control signal is determined, for each line, by five line parameters.

According to an embodiment of the present invention, each line parameter varies according to a curve determined by five column parameters.

The embodiments of the present invention are also directed to a device for adjusting the convergence of three parallel electron beams, which includes a group of horizontal convergence correction coils and a group of vertical convergence correction coils, each group being controlled by a control signal such as previously described.

The embodiments of the present invention also provide a device for correcting the luminance of a screen lit by at least one electron beam of controllable intensity, the intensity of the electron beam being corrected by a control signal such as previously described.

The present invention is also directed to an embodiment of a circuit for generating a control signal such as previously described, including a first calculator adapted to generating the control signal based on a predetermined number of line parameters, synchronized with a screen line scanning signal, and at least one second calculator adapted to generating the line parameters of each line of the screen based on a predetermined number of column parameters, synchronized with a vertical screen scanning signal.

The foregoing objects, features and advantages of the present invention, will be discussed in detail in the following non-limiting description of specific embodiments in connection with the accompanying drawings.

DETAILED DESCRIPTION OF THE INVENTION

The same elements have been referred to with the same references in the different drawings. For clarity, only those elements of the correction system that are necessary to the understanding of the present invention have been shown in the drawings and will be described hereafter. In particular, the details constitutive of the deviation circuits have not been shown and are considered as known. Further, the representations of the drawings (especially FIGS. 4, 5, and 7) are not to scale.

Rather than storing the control signal to be provided to the correction coils at a large number of predetermined screen points, and then interpolating the control signal between two stored values, the present invention provides generating a control signal that is only based on a curve calculated by a calculator based on a small number of parameters. These few parameters can be determined by an operator. Such a curve may, for example, be a combined curve equal to the addition of several simple mathematical curves, easily generated by a calculator and determined by very few parameters (preferably, less than ten).

FIGS. 4A to 4D illustrate the obtaining of a control signal CS for a line according to an embodiment of the present invention that follows a combined curve (FIG. 4D) corresponding to the addition of three simple curves. The first curve (FIG. 4A) is a constant level determined by a parameter P1. The second curve (FIG. 4B) is an $X^n$ curve, where n is any predetermined positive value (integral of decimal), a first minimum or maximum of which is located at the center of the screen line and the end values of which (maxima or minima) are respectively determined by two parameters P2 and P3. The third curve (FIG. 4C) is a double-top curve with a continuous derivative and including at least two peaks defining maximum values, the respective values of which are determined by two parameters P4 and P5, on either side of the line center. The value of this curve at the line center is preferably zero and the ends of the curve have, preferably, a zero value. According to the preferred embodiment of FIG. 4C, the double-top curve has null derivatives at its two ends. Control signal CS formed by the addition of these three curves is particularly well adapted to correction coils of a CRT screen: it is defined by five parameters only, it exhibits enough variations to cover the conventional defects of a screen, and it has no change of incline. It should be noted that these parameters can be positive or negative.

The $X^n$ curve (FIG. 4B) is, preferably, calculated for each half-line. The curve is first calculated to take value P2 at the beginning of the line and, preferably, value 0 at the end of the line. Then, the curve is calculated based on minimum value 0 at the middle of the line and to take maximum value P3 at the end of the line. These calculations, easily performed based on the $X^n$ formula and on the minimum and maximum values of the curve on each half-line, are made for a predetermined number of points on the curve.

The double-top curve (FIG. 4C) is, preferably, also calculated for each half-line. The first half of the curve is a bell or hump having, preferably, a null derivative and zero values at the beginning and in the middle of the line, and having a null derivative and taking value P4 at one quarter of the line. The second half of the curve is a hump having, preferably, a null derivative and zero values at the middle and at the end of a line, and having a null derivative and taking value P5 at the three quarters of the line.

Figure 4A:
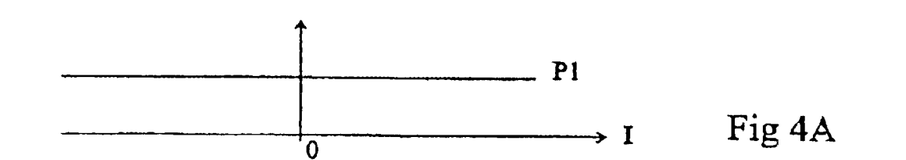
FIGS. 4A to 4D schematically show an embodiment of the structure of a control signal for a line according to the present invention.
Figure 4B:
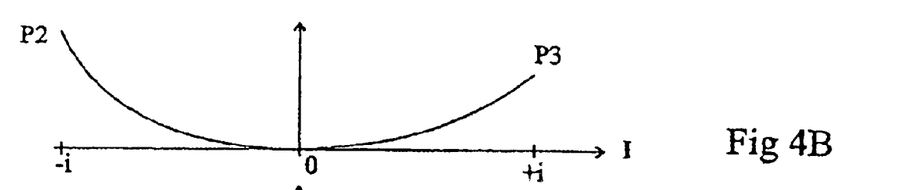
Figure 4C:
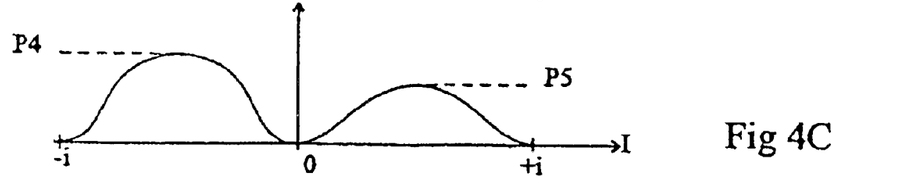
Figure 4D:
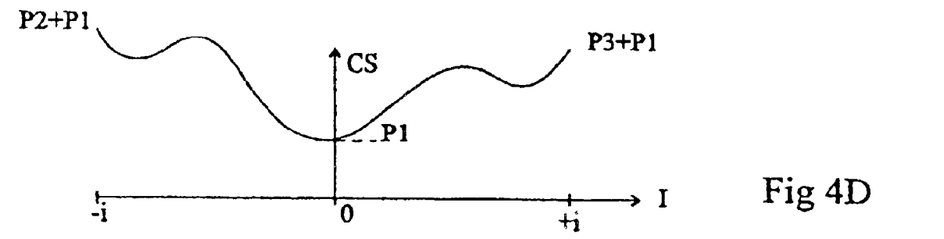

Preferably, a same number of points is calculated for the double-top curve and for the $X^n$ curve. The calculation of the points of the preceding curves may be performed by a conventional calculator or by a specific fast calculator that uses a reduced table of values stored in a ROM. The values calculated for each point are added conventionally and they are provided to a digital-to-analog converter to generate an analog signal for controlling the horizontal or vertical convergence correction coils. As an example, the calculation of 32 points for one half screen line enables satisfactory control of conventional convergence correction coils. The control signal of each line is calculated in a completely numerical way by following a curve calculated as seen previously and the value of the signal at each point of the line only depends on the position of the point on screen. On a line, this position is a function of current I provided to the deviator of the electron beam, and of the screen scanning format. In case of a change in the scanning format, it is simple to reprogram the calculator so that it still associates the same value of the correction signal to a same point of the screen. This operation, commonly called a tracking, is implementable by a reprogramming within the abilities of those skilled in the art and which will not be detailed any further.

Even though five parameters are sufficient to determine the control of the vertical or horizontal correction coils for a screen line, it is not conceivable in practice to determine, then store, five parameters for each screen line.

A first solution consists of separating the screen in several horizontal strips and determining five parameters for each of the strips only. In such a solution, however, the correction control determined for one strip may be very different from the correction control of a neighboring strip. Such correction discontinuities can adversely affect the screen aspect and they are not desirable. The previously-discussed disadvantages of discontinuity between the lines thus reappear.

Another solution consists of storing the line parameters of several standard lines distributed over the entire screen, calculating the correction control for two consecutive standard lines, then calculating the correction control of each intermediary line by interpolation. Such a solution can provide satisfactory corrections on screen. However, a large number of standard lines is necessary for the interpolation calculation to provide good results. This requires determining and storing a large number of line parameters, which is relatively heavy to implement. The previously-discussed disadvantages of an interpolation at the line level here reappear.

According to the embodiments of the present invention, it is provided to calculate, for each screen line, the line parameters (for example, five) used to calculate the control signal of this line. It is further provided to have each parameter vary from one line to the other (or vertically) according to a combined curve such as previously described, also determined by five column parameters. Thus, a composite control signal is calculated according to the present invention, which varies within each line and from one line to the other.

Figure 5A:
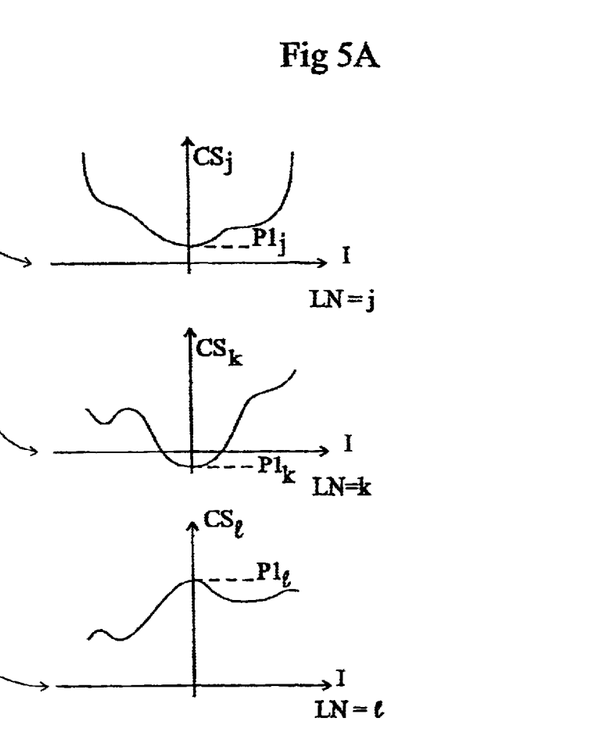
FIGS. 5A to 5C schematically show an embodiment of the line control signals according to the present invention for three different lines of a screen, as well as the combined curve that enables calculating a first line parameter for each of the lines.
Figure 5B:
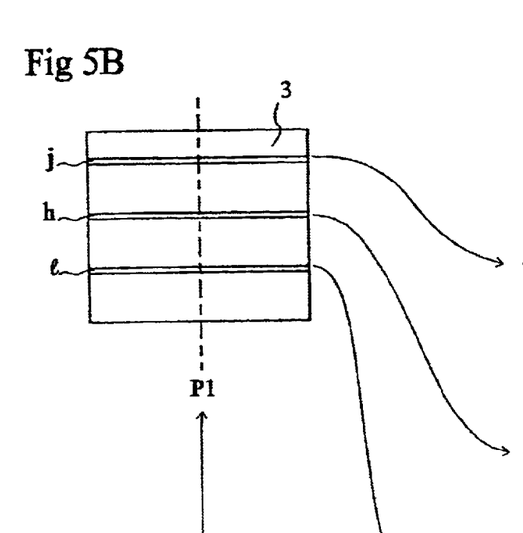

FIG. 5A shows three correction control signals $CS_j$, $CS_k$, $CS_l$, applied to three lines j, k, l of a screen 3 shown in FIG. 5B.

Figure 5C:
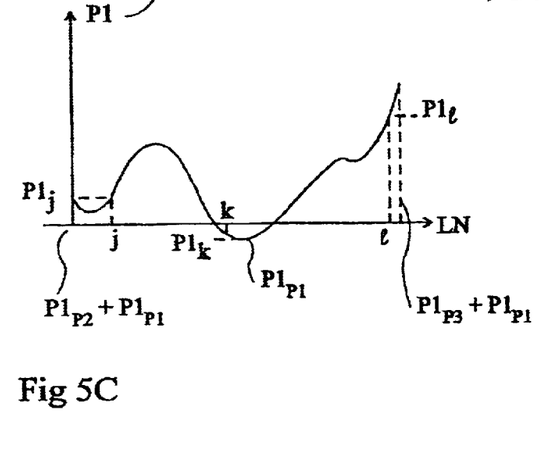

FIG. 5C shows, as an example, the variation of line parameter P1, which sets the constant level used to calculate the control signal of each screen line. Parameter P1 follows a combined curve determined by five column parameters $P1_{P1}$ to $P1_{P5}$. Like the previous sum curves, the curve of definition of parameter P1 is the addition:

of a constant level determined by parameter $P1_{P1}$, of an $X^n$ curve determined by parameters $P1_{P2}$ and $P1_{P3}$, preferably obtained by junction of two half-curves having a common maximum or minimum in a position substantially corresponding to a central line of the screen, and of two humps of a double-top curve determined by parameters $P1_{P4}$ and $P1_{P5}$.

Similarly, line parameters P2, P3, P4, and P5, not shown for clarity reasons, each follow a combined curve determined by five column parameters, respectively $P2_{P1}$ to $P2_{P5}$, $P3_{P1}$ to $P3_{P5}$, $P4_{P1}$ to $P4_{P5}$, and $P5_{P1}$ to $P5_{P5}$. Thereby, for a line Y of the upper part of the screen, a parameter Pi will be provided by the following formula:

$$Pi=Pi_{P1}+(Pi_{P2})Y^n+(Pi_{P4})f(Y),$$

where f(Y) is the image of value Y in the preceding double-top function. Similarly, for a line Y of the lower screen portion, a parameter Pi will be provided by the following formula:

$$Pi=Pi_{P1}+(Pi_{P3})Y^n+(Pi_{P5})f(Y).$$

It should be noted that the control signals determined by these parameters exhibit no discontinuity from one line to the other and no change of incline from one point to the other, while being determined by a very small number of parameters. Indeed, 25 column parameters are sufficient to completely determine the 5 line parameters for each screen line, and thus the control signal provided for the entire screen to a group of horizontal convergence (or vertical convergence) coils. Thus, 50 parameters enable controlling the horizontal and vertical correction coils. These 50 parameters can be easily determined by an operator or an automatic device observing each screen, for example on the production line.

Figure 6:
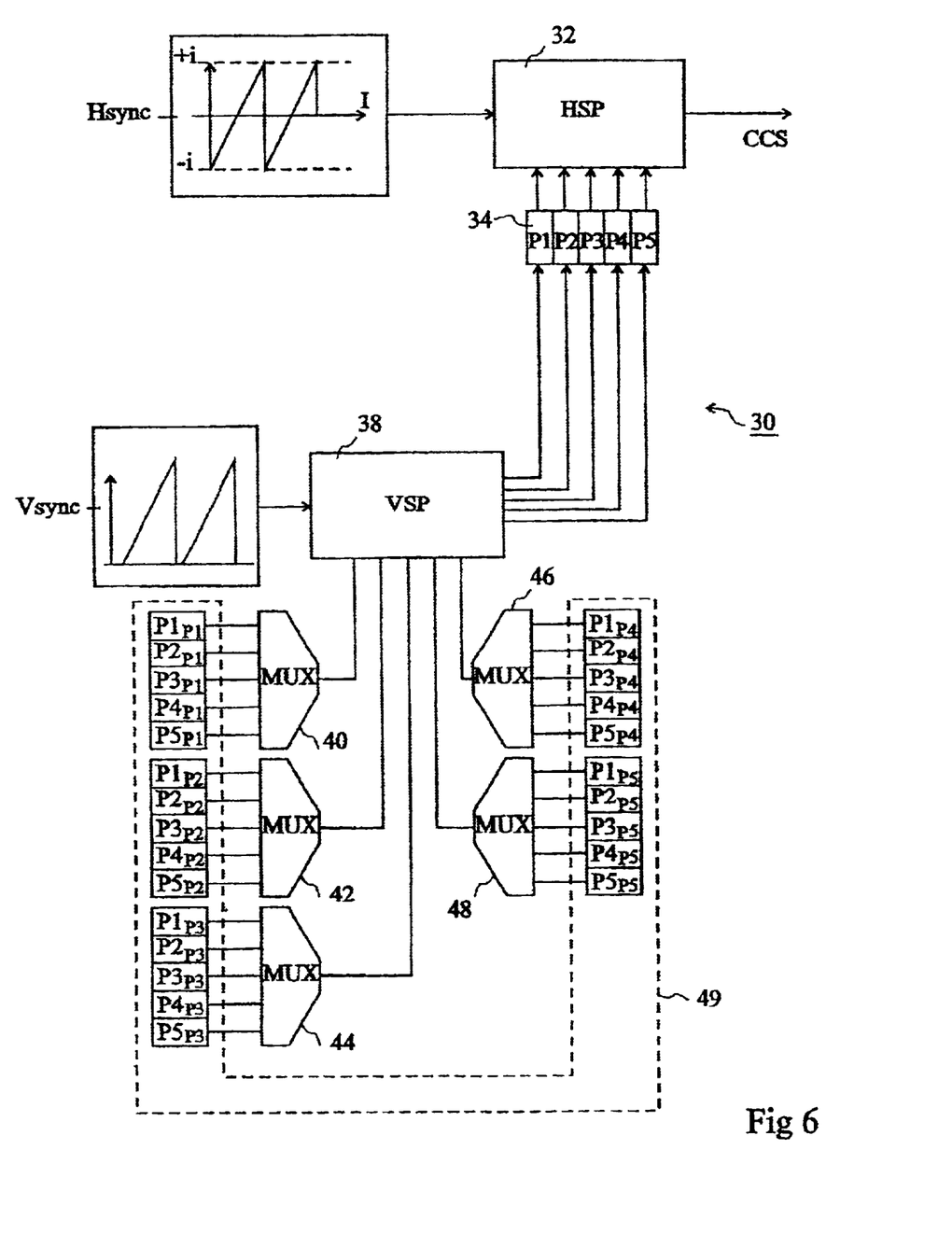
FIG. 6 schematically shows an embodiment of a control signal generated according to the device of the present invention.

FIG. 6 schematically shows an embodiment of a circuit 30 that generates a control signal for a group of horizontal correction coils according to the present invention. This circuit operates in synchronization with a circuit for controlling a group of vertical correction coils. The latter, similar to circuit 30, is not shown. The synchronization of the correction coil control circuits is not modified by the implementation of the present invention and is conventional. Control circuit 30 receives, as a time base for the line scanning, a signal having a period $T_{HSYNC}$ (for example, sawtooth signal I of FIG. 1). It includes a horizontal combined curve calculator (HSP) 32, provided for calculating, in one line scanning period, a combined curve such as previously described based on five line parameters (P1, P2, P3, P4, P5) provided by a register 34. Each line parameter is written into register 34 connected at the output of a vertical combined curve calculator (VSP) 38. Calculator 38 receives, as a time base for the vertical scanning of the screen, a signal of period $T_{VSYNC}$, and it receives five parameters from five multiplexers 40, 42, 44, 46 and 48. Multiplexer 40 includes five inputs, each of which is connected to a distinct memory bucket of a memory 49, respectively provided for receiving column parameters $P1_{P1}$, $P2_{P1}$, $P3_{P1}$, $P4_{P1}$, $P5_{P1}$. Multiplexer 42 includes five inputs, each of which is connected to a distinct memory bucket of a memory 49, respectively storing column parameters $P1_{P2}$, $P2_{P2}$, $P3_{P2}$, $P4_{P2}$, $P5_{P2}$. The same structure is reproduced for multiplexers 44, 46, and 48, which each include five inputs, each of which is connected to a distinct memory bucket of memory 49 to respectively store column parameters $P1_{P3}$ to $P5_{P3}$, $P1_{P4}$ to $P5_{P4}$, and $P1_{P5}$ to $P5_{P5}$. In practice, the access to the column parameters stored in memory 49 may be performed by means of a conventional addressing system. The representation of FIG. 6 is directed to providing functionally showing a mode for reading these parameters.

The elements of circuit 30 are connected so that their operation is managed by a microprocessor, which has not been shown for clarity reasons. Calculator 38 provides calculator 32 with the five line parameters necessary to calculate the signal for controlling the correction coils for each screen line, before it is displayed. For this purpose, multiplexers 40, 42, 44, 46, and 48 are controlled so that calculator 38 successively receives the five parameters necessary to calculate, before it is displayed, each of the five line parameters of a line according to the position of the line on screen. The line position is conventionally determined according to vertical synchronization signal VSYNC.

Of course, this embodiment of the present invention is likely to have various alterations, modifications, and improvements which will readily occur to those skilled in the art. As an example, although a circuit 30 using a single calculator 38 that successively generates the five line parameters necessary for calculator 32 has been shown, a single control circuit using five distinct calculators that simultaneously calculate the five line parameters necessary for calculator 32 may also be developed. In such a case, multiplexers 40, 42, 44, 46, and 48 are no longer useful.

Further, a case in which five parameters are sufficient to determine a combined curve has been described, but other sum curves may also be used, for example a curve determined by nine parameters.

Figure 7A:
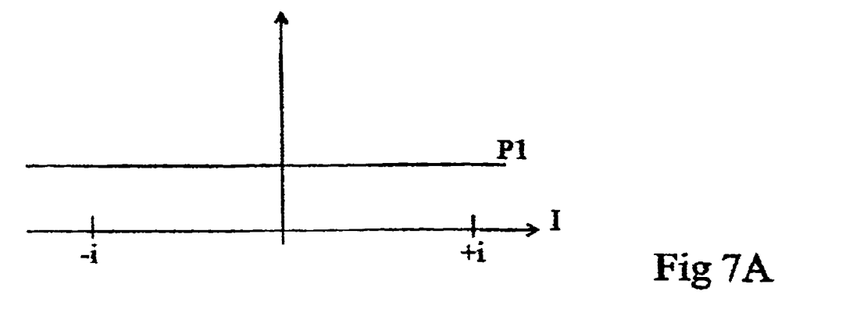
FIGS. 7A to 7D schematically show the structure of a control signal generated according to an alternative embodiment of the present invention.
Figure 7B:
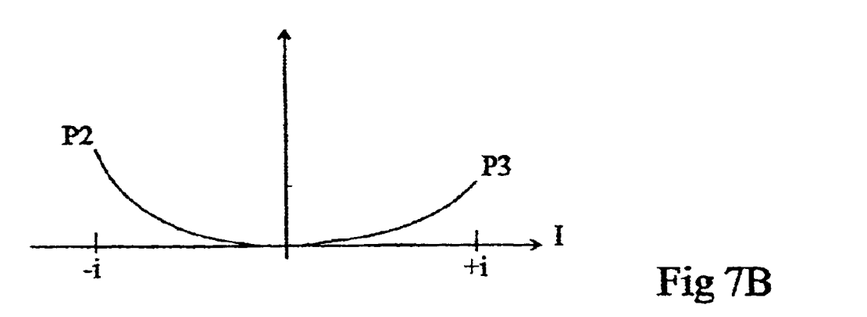
Figure 7C:
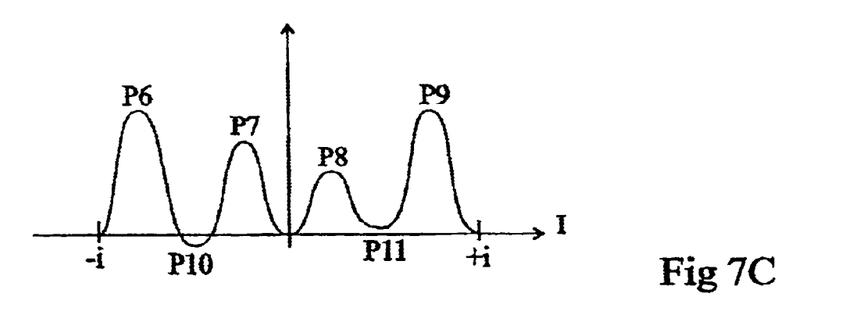
Figure 7D:
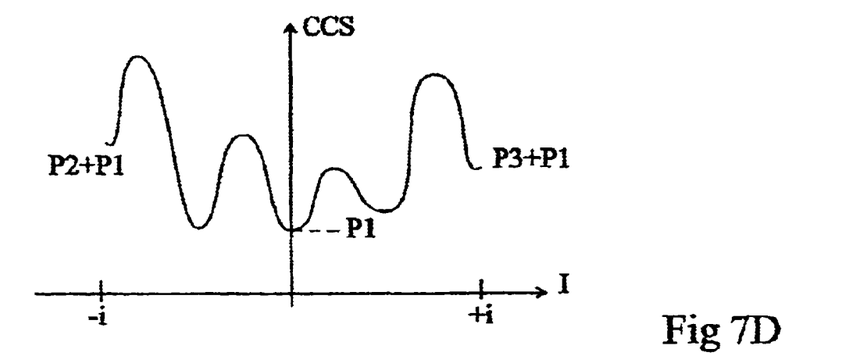

FIGS. 7A to 7D schematically illustrate the obtaining of such a combined curve (FIG. 7D), which is, as previously, the combination of a constant level (FIG. 7A), of an $X^n$ curve (FIG. 7B), and of a double-top curve (FIG. 7C). In this case, however, the double-top curve includes four humps put end to end, each hump having a null derivative at its two ends and at its top and the curve having a zero value at the two ends and at the center of the line. The curve is determined by six parameters: four parameters P6, P7, P8, and P9 each determining the value of a maximum formed by the top of a hump, and two parameters P10, P11, each determining the value of a minimum formed by the junction point, respectively of the first and second humps and of the third and fourth humps. Such a curve will enable finer setting of the control signal provided to the convergence coils. However, curves with five parameters are according to the present invention a preferred compromise in terms of accuracy and simplicity. It should be noted that it is also possible to use other double-top curves than those which have been described, for example a curve, the ends of which are tops of half-humps.

Moreover, although the present invention has been described hereabove in relation with a CRT screen provided with convergence correction coils, it more generally applies to any beam correction system of a display or projection device. Indeed, all such systems conventionally use beam correction means, in particular static means, which may be reused to implement the present invention. Adapting the present invention to such means is within the abilities of those skilled in the art based on the functional indications given by the above description.

For example, a correction signal according to the present invention can enable correcting a non-uniformity of the chrominance or of the luminance of a CRT screen.

Figure 8:
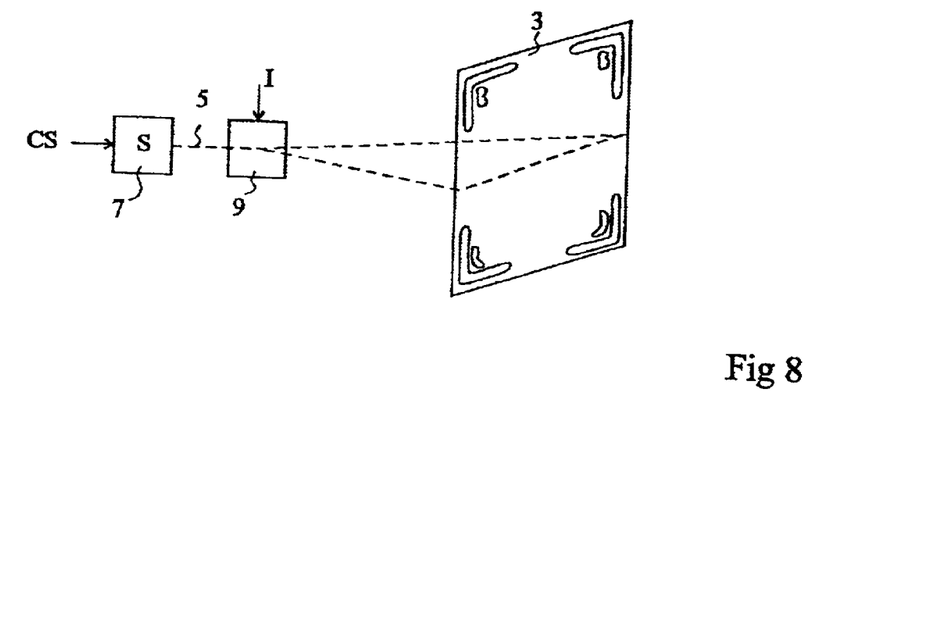
FIG. 8 schematically shows another application of a control signal generated according to the present invention.

FIG. 8 very schematically and partially shows, in a view to be compared to that of FIG. 1, a screen 3 associated with elements taking part in the display. This drawing illustrates an application of the present invention to a luminance correction. It shows a CRT screen 3 for displaying black and white images based on a video signal (not shown) that especially controls the intensity of an electron beam 5. Electron beam 5 is generated by a source 7 and deviated by a deviator 9. Screen 3 has, in particular at its corners, luminance non-uniformity areas, or dark areas. According to the present invention, the dark areas of screen 3 are suppressed by providing source 7 with a composite correction signal that corrects the intensity of the electron beam. In this case, the parameters (for example 25) for establishing the signal of correction of the beam intensity at any point of the screen will be determined in a test phase so that the screen has a uniform luminosity when it receives a uniform video signal. It should be noted that a correction input used to receive a conventional static correction signal may have too slow a frequency response to receive a composite signal according to the present invention. In such a case, however, those skilled in the art will readily known how to adapt the speed of conventional correction means.

It should also be noted that a case has been described in which the control signal, provided for each line, is determined based on five line parameters, each of which is itself determined based on five stored parameters. It is however possible that the number of line parameters used to determine the control signal of each line is different from the number of the stored parameters used to determine each line parameter.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A control signal for controlling a means for correction of at least one electron beam that scans a screen line by line, the control signal comprising:

an amplitude of which varies along each screen line according to a first curve of a first type determined by a plurality of line parameters, each of the plurality of line parameters generated to vary from screen line to screen line according to a second curve of the first type determined by a plurality of column parameters, each of the first and second curves of the first type comprises the combination of:

a constant level, determined by a first parameter, two half $X^n$ curves located on either side of the center of the second curve, a common origin of the half $X^n$ curves located at the center of the second curve and the maximum values of the half $X^n$ curves at the ends of the line determined by a second and a third parameter respectively, and a double-top curve with a continuous derivative formed by at least two humps placed end to end and located on either side of a center of the double-top curve, each hump having a null derivative at its top, and each minimum or maximum value of the double-top curve set by a respective parameter.

2. The control signal of claim 1 wherein the double-top curve has a zero value and a null derivative at its center.

3. The control signal of claim 1 wherein the double-top curve has a zero value and a null derivative at its ends.

4. The control signal of claim 1, determined, for each line, by five line parameters.

5. The control signal of claim 1 wherein each line parameter varies according to the second curve determined by five column parameters.

6. A device for adjusting the convergence of three parallel electron beams, comprising:

a group of horizontal convergence correction coils and a group of vertical convergence correction coils, each group controlled by a control signal of claim 1.

7. A device for correcting the luminance of a screen, comprising:

means for generating at least one electron beam of controllable intensity, the intensity of the electron beam corrected by a control signal of claim 1.

8. A circuit for generating a control signal of claim 1, comprising:

a first calculator adapted to generating the control signal based on a predetermined number of line parameters, synchronized with a screen line scanning signal, and at least one second calculator adapted to generating the line parameters of each line of the screen based on a predetermined number of column parameters, synchronized with a vertical screen scanning signal.

9. A method of generating a control signal for correcting at least one electron beam that scans a screen line by line, the method comprising:

determining a plurality of column parameters;

generating a plurality of column curves from the respective plurality of column parameters;

generating a plurality of line parameters from each of the plurality of column curves, respectively, that vary from screen line to screen line; and generating a control signal for correcting the location of the electron beam as it scans the screen line by line, the amplitude of the control signal varying along each screen line according to a plurality of line curves generated from the respective plurality of line parameters;

wherein generating the plurality of column curves and the plurality of line curves comprises:

adding together the following curves:

a constant level curve determined by a first line parameter of the plurality of line parameters;

two half $X^n$ curves, joined together at a common origin forming a center with the maximum values of each half $X^n$ curve at the ends of the joined curves determined by a second and a third parameter, respectively, where n is a predetermined value; and a double-top curve having a continuous derivative and formed by at least two humps placed end to end and located on either side of a center of the double-top curve, each hump having a null derivative at its top and each minimum or maximum value of the double-top curve set by a respective distinct parameter.

10. The method of claim 9, wherein generating the plurality of line parameters comprises varying the line parameters from one line to another according to the plurality of column curves.

11. The method of claim 9, comprising generating the double-top curve to have a zero value and a null derivative at its center.

12. The method of claim 9, comprising generating the double-top curve to have a zero value and a null derivative at its ends.

13. The method of claim 9, the plurality of column parameters comprises five column parameters for each line, and the plurality of line parameters comprises five line parameters for each line.

14. A device for adjusting the convergence of three parallel electronic beams that scan a screen line by line, the device comprising:

a group of horizontal convergence correction coils and a group of vertical convergence correction coils; and a circuit for generating a control signal to the group of horizontal convergence correction coils and a group of vertical convergence corrections coils, the control signal generating circuit comprising:

a first calculator adapted for generating a control signal based on five line parameters synchronized with a screen line scanning signal; and at least one second calculator adapted to generate the line parameters of each line of the screen and that vary from screen line to screen line based on a predetermined number of column parameters synchronized with a vertical screen scanning signal;

wherein the control signal generating circuit is configured to generate a control signal for each electron beam, the control signal having an amplitude that varies along each line according to a first curve of a first type determined by a plurality of line parameters, each of the plurality of line parameters generated according to a second curve of the first type determined by column parameters; and wherein the control signal generating circuit is configured to generate each of the first and second curves of the first type by adding a first curve of the second type of a constant level determined by the first line parameter, a second curve of the second type comprising two half $X^n$ curves joined together at a common origin to form a center of the second curve of the second type, the common origin of each half $X^n$ curve located at the center of the second curve of the second type, and the maximum values of the half $X^n$ curves at the ends of the second curve of the second type determined by second and third parameters, respectively, and a third curve of the second type comprising a double-top curve with a continuous derivative formed by at least two humps placed end to end and located on either side of a center point of the third curve of the second type, each hump having a null derivative at its top and each minimum or maximum value of the double-top curve set by a respective distinct parameter.

15. The device of claim 14, wherein the first curve is determined by five line parameters and the second curve is determined by five column parameters.

* * * * *